United States Patent [19]
Ginsberg et al.

[11] Patent Number: 5,748,728
[45] Date of Patent: May 5, 1998

[54] SHIELD FOR CONCEALING OPERATION OF A KEYPAD

[75] Inventors: Robert L. Ginsberg; Frances R. Ginsberg, both of Melville, N.Y.

[73] Assignee: Phran-Tek Ltd., Oceanside, N.Y.

[21] Appl. No.: 738,919

[22] Filed: Oct. 28, 1996

Related U.S. Application Data

[63] Continuation of Ser. No. 377,905, Jan. 25, 1995, abandoned.

[51] Int. Cl.⁶ ............................................. H04M 1/00
[52] U.S. Cl. ........................... 379/447; 379/450; 379/451
[58] Field of Search ............................. 379/447, 451, 379/437, 453, 445, 440, 143–145, 155; 70/333 A, DIG. 72; 109/49.5, 10–15, 23

[56] References Cited

U.S. PATENT DOCUMENTS

| | | | |
|---|---|---|---|
| 3,633,167 | 1/1972 | Hedin | 340/164 |
| 3,835,680 | 9/1974 | Evans | 70/278 |
| 4,404,823 | 9/1983 | Miller et al. | 70/333 |
| 4,426,862 | 1/1984 | Yamada et al. | 70/69 |
| 4,967,305 | 10/1990 | Murrer et al. | 361/172 |
| 5,153,561 | 10/1992 | Johnson | 340/571 |
| 5,222,445 | 6/1993 | Cepraro | 109/49.5 |
| 5,301,230 | 4/1994 | Barry | 379/447 |
| 5,465,090 | 11/1995 | Deignan | 379/451 |

FOREIGN PATENT DOCUMENTS

| | | | |
|---|---|---|---|
| 220684 | 4/1962 | Germany | 379/445 |

*Primary Examiner*—Jack K. Chiang
*Attorney, Agent, or Firm*—Kenyon & Kenyon

[57] ABSTRACT

A shield conceals operation of a keypad such as a telephone keypad, from a view oblique to the user, who can view the keypad either over or through a front member. The front member is movable such that it does not interfere with normal operation of the telephone, and permits the handset to be conventionally mounted over the keypad. One or two side members extend from the sides of the keypad forward toward the user, for example by a distance at least equal to the width of the keypad. The front member can be pivotable and/or slidable on the side members, and is preferably translucent, whereas the side members are preferably opaque.

19 Claims, 7 Drawing Sheets

SHIELD FOR CONCEALING OPERATION OF A KEYPAD

This application is a continuation of application Ser. No. 08/377,905 filed Jan. 25, 1995, now abandoned.

BACKGROUND OF THE INVENTION

1. Field of the Invention

The invention relates to the field of keypad security devices and in particular concerns a shield for concealing manual operation of a telephone keypad. The shield does not interfere with the normal operation of the telephone; the keypad remains in the user's view. However the shield obstructs the line of sight between the keypad and persons other that the user.

2. Prior Art

Keypads often are used to enter private or secure information as well as routine numerical data. For example, such private information could include a confidential phone number, a banking account number, a long distance calling authorization code, a personal identification number (PIN), etc. It is known to attempt to conceal the manual operation of a keypad or combination lock to prevent such information from becoming known to other parties who may be in position to view manual operation of the keypad or lock by a user.

U.S. Pat. No. 3,835,680—Evans, for example, discloses an enclosure for concealing manual operation of a combination lock, substantially obscuring a view of the hand operating the lock. However, means are provided to enable the user to view the lock as needed to operate it. The enclosure has an upper surface with a window spaced from a rotary selector disk of the lock, such that a small portion of the selector disk can be seen through the window by the user, who is located in front of the window. Otherwise the selector is obscured. The selector disk is marked with angle indicating numbers or the like, defining selector positions representing digits in a combination code. The user determines the selector position by observing a number through the window. The user operates the lock by moving the selector through a series of rotational positions, i.e., by bringing selected code numbers into view in the window, one after another in order.

In Evans the combination disk is mounted below a lower surface of the enclosure, which also has a window. Only one indicia on the disk is visible to the user at a time, namely through the aligned windows on the upper and lower surfaces of the disclosure. The combination disk is coupled to a knob, accessible though a hinged flap door in the enclosure that further conceals the user's hand. The user inserts his or her hand under the hinged flap to rotate the knob while observing the combination disk through the two windows.

U.S. Pat. No. 4,404,823—Miller et al. also discloses a rotary combination lock selector wherein a limited field of view obscures operation of the selector. The combination selector disk has indicia viewed only over a limited area, and in this case along a reflected light path. A housing covers the front face of the disk and the indicia is provided on a rear face of the disk in reverse mirror image. A mirror and reference position pointer at a small opening in the housing allow the user to view the indicia via the mirror, for aligning the indicia to the pointer in operating the lock. Other persons, who unlike the user are not aligned to the light path, cannot observe the indicia to determine the combination of the lock by watching it being opened.

The foregoing locks rely on the user rotating a selector to successive positions defining digits of a code. Other types of security devices are directed at keypad systems in which the user successively operates selected buttons in a plural button array. Keypads are typically but not exclusively electrical. U.S. Pat. No. 3,633,167—Hedin is an example of a door lock keypad console for controlling access to a room or building through a door. The keypad is mounted adjacent to the door and is arranged to enable or disable an electromechanical door locking mechanism depending on whether the proper sequence of push buttons is operated to enter a valid access code. In Hedin, an enclosure surrounds push buttons that can be seen through the enclosure, the enclosure apparently protecting the keys from weather rather than from view. The keys of a keypad must be visible to the user for making selections. It would be possible to operate a keypad by feel, but this is only practical if there are only a few keys.

U.S. Pat. Nos. 4,426,862—Yamada et al.; 4,967,305—Murrer et al.; and 5,153,561—Johnson show examples of keypads covered by protective flaps that are pivoted out of the way to view the keypad during operation. Such flaps protect the keypad against contaminants, particles, weather and the like, but do not obscure the keypad when opened.

The foregoing devices are each associated with a form of lock having means for entering a code to obtain access. Another form of access is obtained using a keypad of the type provided on a telephone or on an automatic teller machine (ATM). Users of these keypads may wish to enter private phone numbers, account numbers, passwords, access codes, personal identification numbers and various other data that are also advantageously kept from the view of others. In a typical phone booth or ATM installation, a relatively small space is provided for the user to stand. Whereas the user stands in front of the keypad, the user's body blocks the keypad from view to some extent. However, this amount of blocking is generally not sufficient to prevent a party who makes an effort to view the keypad from doing so, particularly by viewing the keypad from an oblique position. Viewing is often easily accomplished due to the transparent walls typically provided on phone or ATM booths or the like, or in crowded installations of multiple telephones where it is impractical to provide extensive visual shielding.

It would be possible to more fully shield the keypad of a telephone or ATM from view by persons other than the user. However, this should be accomplished without interfering with the comfort or ease of operation of the device by the user, and in particular without interfering substantially with the user's view of the keypad.

It is an aspect of the present invention to optimally integrate a keypad shield with conventional telephone equipment, particularly suited public or pay telephones at which a user may wish to enter access code information for paying for telephone calls or other services. Telephone companies allow users to charge calls to phone company accounts, credit card accounts, debit card accounts and the like, frequently in connection with access codes. After dialing the appropriate telephone number or phone number prefix and the called party's number, the user is prompted, for example, by an audio tone or verbal prompt to enter charge information in order to complete the call. Such information may include an account number (e.g., a calling card number) and a personal identification number (PIN) or password.

An increasing concern in using pay telephones is preventing an unauthorized individual from observing a telephone user's key depressions while placing a calling card call, so as to determine the user's account number and PIN. In airports, train stations and bus stations, travelers find it very convenient to place calling card calls. But these places are the most likely to have crowded unshielded installations for telephones.

A criminal can observe manual operation of a keypad from a distance, for example to enter a telephone calling card number and PIN, using equipment such as binoculars or video equipment for magnification and/or recording and playback. Once the calling card number and PIN are obtained, the criminal can sell these access numbers to individuals who may place expensive long distance calls. The stolen calling card numbers may only be used for a short period of time for minimizing the likelihood that anyone is caught, but many thousands of dollars are lost before users are even aware that their calling card numbers have been stolen.

Apart from calling card and PIN numbers, there are many categories of information and/or access to services that are enabled or disabled by keypad entries such as the touch tone keypads of telephones. Examples are automated attendants, voice mail systems, interactive voice response systems, automated order processing systems, telephone "900" service numbers, banking and other account information and transactions, and the like. This information may be sensitive, and/or the services accessed in this manner may be valuable.

For example, voice mail systems often have automated attendant procedures that enable a caller to determine the identity of a party at a particular extension, for example by determining the party's name from the answering message, and to monitor the person's voice mail, personal information and business transactions. It is possible to try a known access code on successive extensions of a private branch exchange (PBX) until a particular one works. Having obtained access to a voice mail system, a criminal may change the password, locking out the owner, and then use the voice mail system as a secure message system, for example for drug transactions. Some systems also allow persons to place outgoing calls through the PBX after gaining access. In this way calls originated from a remote location are billed to the PBX. It would be desirable to limit access to automated attendant and voice mail systems to prevent unauthorized access to information and services in these and other ways.

Integrated voice response telephone systems have been implemented by many different businesses. Bank card issuers may allow card holders to check the status of their accounts. Credit companies may provide information on recent purchases. Investment companies may allow users to check on their investments and transfer funds between accounts. Educational institutions may allow students to obtain transcript and registration information. All of this information is available using the appropriate access codes, and may be highly confidential, private and/or subject to corruption by unscrupulous persons.

It would be desirable to incorporate a security device for concealing the operation of keypads so that unauthorized individuals cannot gain access to telephone users' access numbers and other information by observing the user's key depressions. It would also be advantageous if this could be accomplished in a manner suited to telephones, especially conventional public telephones, in a manner that does not require substantial modification of the telephone or make the telephone inconvenient to operate in a conventional manner.

SUMMARY OF THE INVENTION

It is an object of the invention to provide a shield for concealing manual operation of a keypad without substantially interfering with the user's ability to see and operate the keypad.

It is another object to provide a visible shield specifically arranged for mounting on a telephone.

It is also an object to provide a shield that can reside under a telephone handset in its cradle, that does not obscure the keypad of the telephone when the handset is lifted for use.

It is also an object of the invention to provide a shield for a telephone keypad the provides the user an unobstructed view while shielding the keypad from view by unauthorized persons.

It is another object of the invention to provide such a shield that can be fitted without modification to the topology of a conventional telephone.

These and other objects are accomplished by a shield for concealing the operation of a telephone keypad. The shield has at least one side member extending forward toward the user from a position laterally adjacent to the keypad for limiting the field of view of the keypad. Preferably, two side members are disposed on opposite sides of the keypad. The user can view the keypad between the side members, and the side members obscure the keypad from a viewer who may attempt to view the keypad obliquely, e.g., from the side or over the user's shoulder.

Preferably a movable front member is disposed on at least one of the side members to further limit view. The front member can be slidable, pivotable or rotatably mounted so as to be movable between a deployed position and a stored position. According to one embodiment, the front member has a forward position in which the user can view the keypad over and/or through the front member while reaching behind the front member to the keypad, and a rearward position closer to the keypad permitting the front member to fit under a standard telephone receiver placed over the keypad and in a conventional telephone receiver cradle. The shield is appropriately sized to work in conjunction with existing telephone equipment without modifying telephone topology.

According to further embodiments, the front member can be pivoted to the telephone housing or to one of the side members such that it can be moved over the keypad or pivoted to expose the keypad wholly or partly. The front member can be opaque, but preferably is merely translucent such that the user can view the keypad through the front member sufficiently to operate it. The front member obscures operation of the keypad from other viewers.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings.

DETAILED DESCRIPTION OF THE PREFERRED EMBODIMENTS

Figure 1:
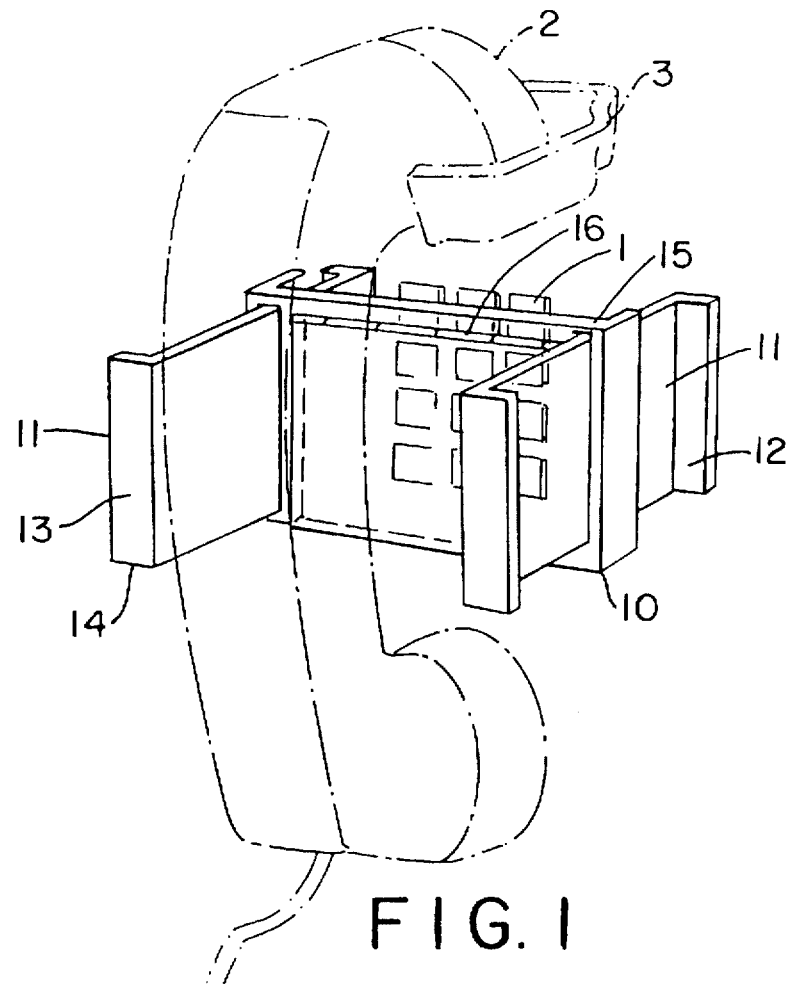
FIG. 1 is a perspective view of a shield which is hingable and operable to reciprocate in the front to back direction, the shield is shown retracted towards the back direction in accordance with the invention as viewed from the front right.
Figure 2:
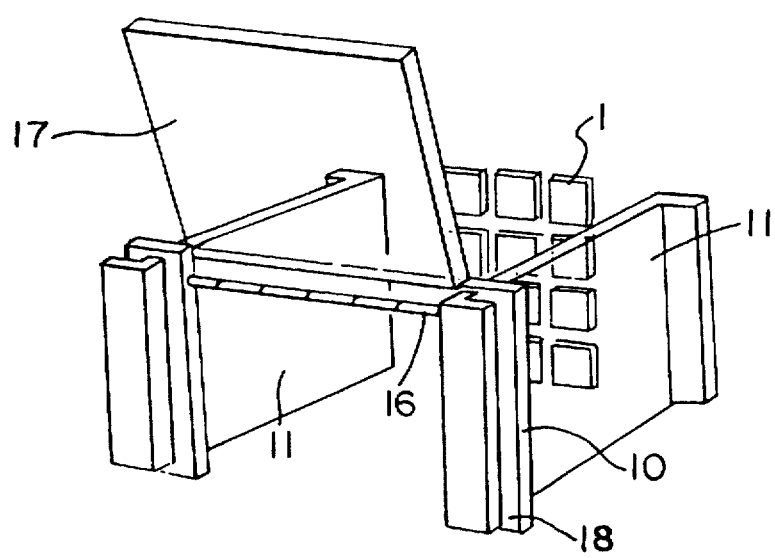
FIG. 2 is a perspective view of a shield which is hingable and operable to reciprocate in the front to back direction, the shield being shown extended towards the front and viewed from the front right.

As shown in FIGS. 1 and 2, the keypad shield according to the invention is mounted over a telephone keypad or the like, for obscuring operation of the keypad to viewers other than the user, who is positioned directly in front of the keypad. In this embodiment, the shield has a hinged and slidable front member that is movable in a front-to-back direction for deployment and storage, respectively. The shield has a front member 10 and two side members 11, the side members being attached to the telephone adjacent the sides of the keypad 1 while providing sufficient space for a user to insert his or her hand for operating the keypad when the front member is moved forward. The front member can be opaque, such that the user views the keypad over the front member, or translucent, such that the user views the keypad through the front member.

The shield as shown is installed on a conventional touch tone telephone. Other keypad types, such as ATM keypads and the like, can be similarly equipped. Each side member has a base or rear end 12 which is attached on either side of the keypad 1, for example by screws, adhesive or the like. Each side member has a front end 13 which is formed with a retaining ear 14. The side members are parallel to each other and spaced apart such that there is sufficient clearance for the telephone handset 2 and the user's hand between the side members. The front member is pushed rearwardly when the telephone handset is placed on the receiver cradle and hook switch 3.

According to the embodiment of FIGS. 1 and 2, the front member is formed with two slots 15 in which the side members are engaged, such that the front member is perpendicular to the side members and is operable to slide freely in the front to back direction along the length of the side members. The front member is shown retracted towards the back in FIG. 1, and deployed in FIG. 2, where the front member has been moved to the extreme front, where it contacts the retaining ears.

In this position the telephone receiver is off-hook and there is sufficient room for a telephone user to reach under the front member and operate the keypad. The front member is divided into two portions which are coupled by a hinge 16. The inner portion 17 is hingable with respect to the outer portion 18. The inner portion can be hinged or rotated part way up for the user to reach under the shield to operate the keypad in a secure manner, or all the way up if the user does not require security. The front member is preferably translucent such that the user can view the keys through the front member. The side members are preferably opaque so that they obstruct the line of sight to the keypad when viewed from the periphery.

Alternatively the front member can be manufactured from a translucent material that is optically biased (e.g., to collimate the view of the keypad) or polarized so that only user who is standing directly in front of the keypad can see the keypad through the front member.

The shield as shown in FIGS. 1 and 2 fits immediately adjacent or against the keypad in the rear position and thus fits under the telephone handset in the on-hook position. Alternatively, the shield also can be made large enough to cover the handset as well as the keypad.

In an open location at which the user might be viewed from either side, two side members are preferred. It is also possible, for example where a telephone is mounted in a corner, to use one side member on the exposed side only. There are a number of specific structural arrangements possible for the front and side members, including the slide arrangement of FIG. 1 and others. The front member can be slidably mounted on the telephone, or hinged to the telephone or to one of the side members, such that the front member can be stored or deployed.

Figure 3:
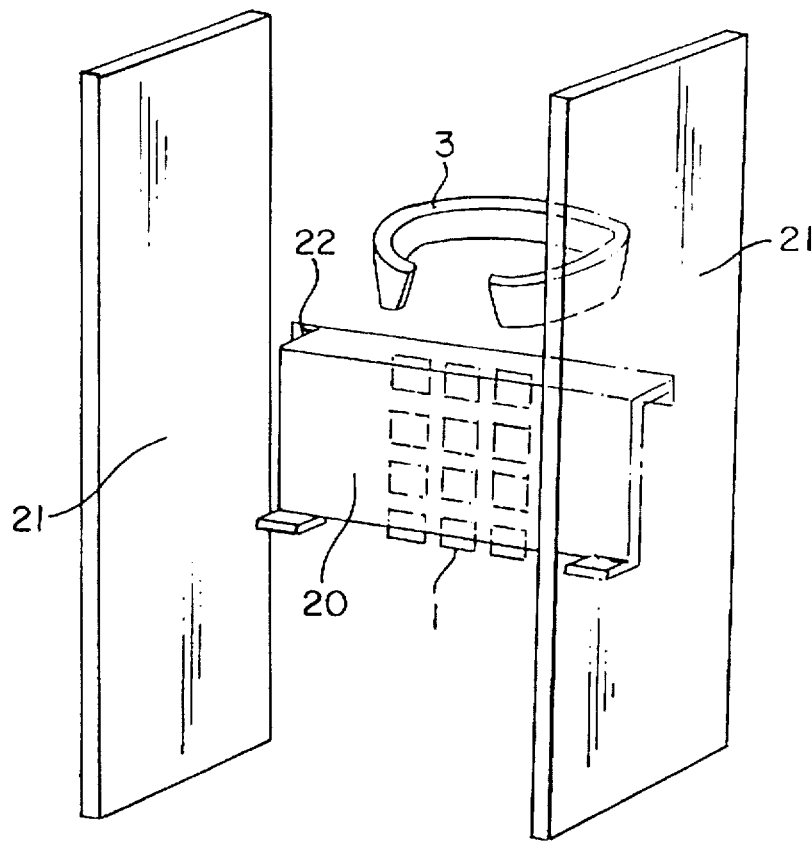
FIG. 3 is a perspective view of an alternative embodiment in which the shield has a front member operable to pivot between the a horizontal and vertical orientation between side members.

FIG. 3 shows an alternative embodiment wherein the shield pivots between horizontal and vertical orientations. The shield has a front member 20 and two side members 21 and as above is installed on a conventional touch tone telephone. The side members are attached to the telephone on opposite sides of the keypad 1. The side members are spaced to provide sufficient clearance between the telephone handset and the side members when the telephone handset is on-hook. The side members are preferably opaque so that they obstruct the line of sight to the keypad when viewed from the periphery.

Figure 4:
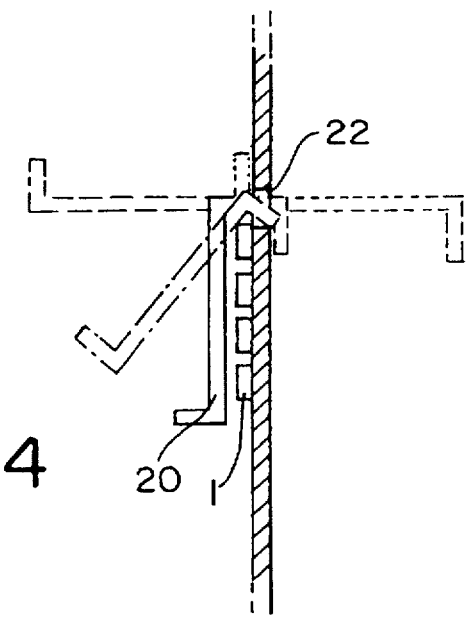
FIG. 4 is a side sectional view of the shield of FIG. 3.

The front member is essentially rectangular in shape and is engaged in a slot 22 in the telephone such that it can hinge at the top edge and reciprocate in the front to back direction as shown by dashed lines in FIG. 4. When the front member is lifted into the horizontal position it can be manually slid into the slot in the telephone so that the user can access the keypad without using the front part of the shield, if desired.

Alternatively the front member can be automatically moved into the horizontal position and retracted into the slot by an actuator associated with the hook switch, e.g., using a motor or other actuator (not shown).

Figure 5:
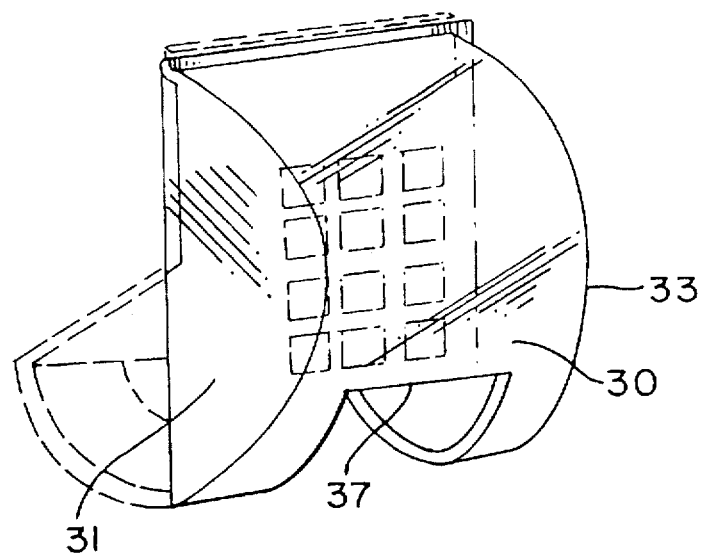
FIG. 5 is a perspective view showing an alternative embodiment in which the shield has a substantially semi-circular profile and pivots between up and down positions.
Figure 6A:
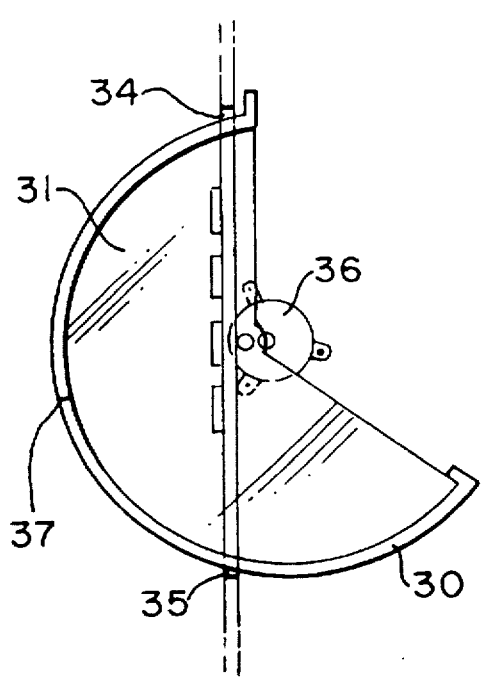
FIG. 6a is a side sectional view of the shield of FIG. 5, pivoted down.
Figure 6B:
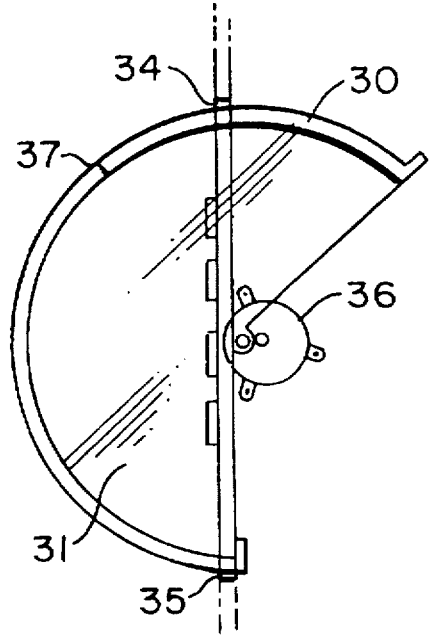
FIG. 6b is a side sectional view of the shield of FIG. 5, pivoted up.

FIG. 5 shows an alternate embodiment where the shield has a curved profile and is mounted to pivot between up and down positions as shown in FIGS. 6a and 6b. The shield has a front member 30 and two side members 31 and is installed on a conventional telephone. The side members are parallel to each other and spaced to straddle the keypad 1. The front member is formed with a rectangular opening. In the down position the keypad is substantially enclosed by the shield, the shield is rotated part way up for the user to reach into the rectangular opening to operate the keypad in a secure manner, or all the way up if the user does not require security.

The junction of the front member and side members is curved along the front edges 33 of the side members. The side members are preferably opaque to obstruct the line of sight to the keypad when viewed from the periphery. In the up position as shown in FIG. 6b, a portion of the front and side members passes through a upper slot 34 in the front panel of the telephone and lower slot 35 below the keypad (FIG. 5). A drive means 36 can be coupled to the shield such that the shield is automatically pivoted into the up position upon a user lifting the telephone handset (not shown).

Alternatively the shield can be operated manually, without a drive means. It is desirable to raise the shield only so far as necessary to permit operation of the keypad. In this way the side members of the shield block as much of the lateral view to the keypad as possible. The user raises the shield such that there is sufficient room to reach under the upper edge 37 of rectangular opening and to view the keypad through the front member to operate it. The shield can be spring biased to return to the down position, and manually held in the up position by resting edge 37 on the back of the user's hand. It is also possible to provide a frictional latch to hold the shield open when desired. Alternatively the shield can be freely pivoted such that it falls into the closed position by gravity.

The front member can be translucent or otherwise optically biased, polarized or the like, to limit viewing to the user who is standing directly in front of the keypad. The user, who is within arm's reach of the keypad, can see the keypad through a translucent front member sufficiently for operation. The front member can alternatively be clear and provided with a collimating lens such that the image of the keypad is restricted to a relatively small angle.

Figure 7:
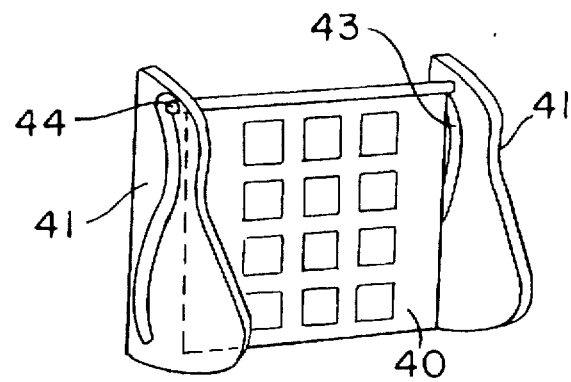
FIG. 7 is a perspective view of an alternative embodiment having a front member which is pivotable and movable between the up and down position via tracks in the side members.

FIG. 7 shows an alternative embodiment wherein the front member of the shield is both pivotable and slidable. The shield has a front member 40 and two side members 41 and can be installed on a conventional telephone or other keypad which is to be operated securely. As in the foregoing embodiments, the side members are attached on either side of the keypad with clearance for the telephone handset and the user's hand. With the front member in the up position the keypad is covered by the shield and can be pivoted for the user to reach the keypad.

Figure 8A:
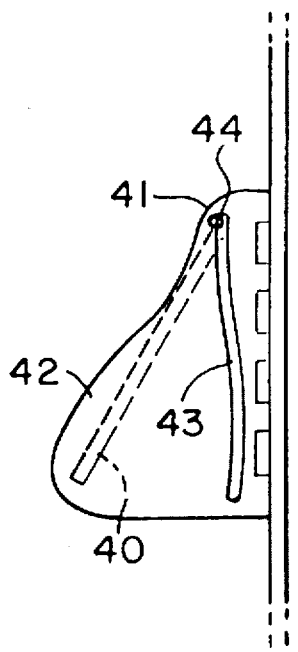
FIG. 8a is a side sectional view of the shield of FIG. 7, shown in the up position with the front member pivoted upward.
Figure 8B:
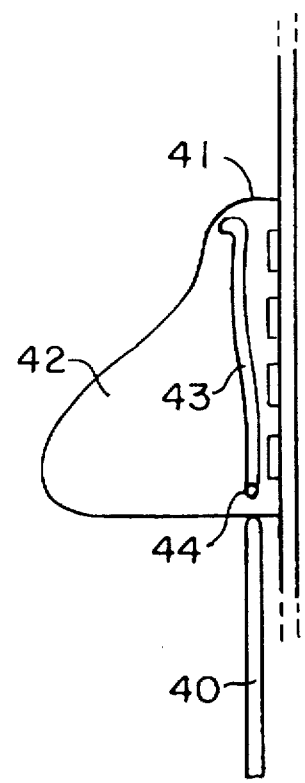
FIG. 8b is a side sectional view of the shield of FIG. 7, shown in the lower position where the keypad is exposed.

As shown in FIGS. 8a and 8b, the inside faces 42 of the side members have a slot 43 into which laterally protruding pins 44 of the front member engage. The slots can pass through the side members, but preferably are formed only on the inside faces of the side members so as to better obscure the keypad. The side members are opaque for obstructing the view of the keypad from the sides.

In FIG. 8b the front member is slid into the down position. In this position the user can access the keypad yet the side members obstruct unauthorized persons view of the keypads from the periphery. According to this embodiment the front member is hinged to the side members on a horizontal axis. It will be appreciated that the front member can also be hinged to one of the side members on a vertical axis.

Figure 9A:
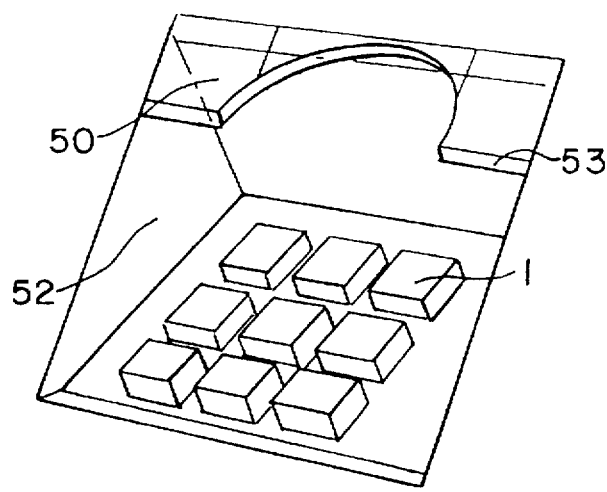
FIG. 9a is a perspective view of an alternative embodiment having a front member movable between the up and down fixed position via tracks in the front panel, the front member is shown in the up position.

FIG. 9a shows an alternative embodiment wherein the front member 50 of the shield is slidable via tracks in the front panel (not shown), the front member is shown in the up position. The keypad 1 is shown recessed into the front panel 51. The side members 52 are mounted behind the front panel. The front member has a semi-circular notch in the bottom edge 53. With the front member in the up position the user has full access to the keypad yet the side members obstruct unauthorized persons view of the keypads from the periphery.

Figure 9B:
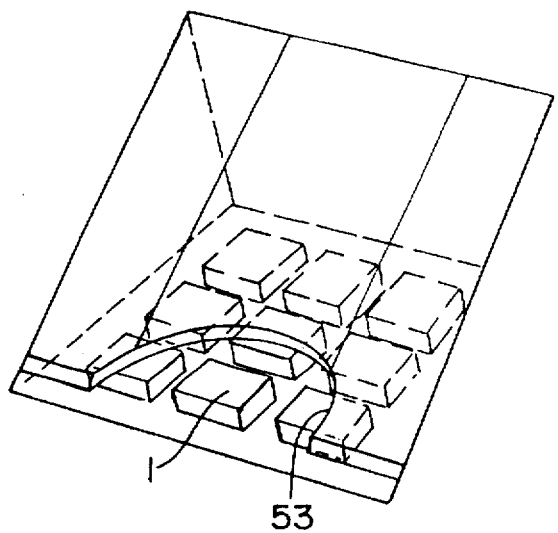
FIG. 9b is a perspective view of an alternative embodiment having a front member movable between the up and down fixed position via tracks in the front panel, the front member is shown in the down position.
Figure 9C:
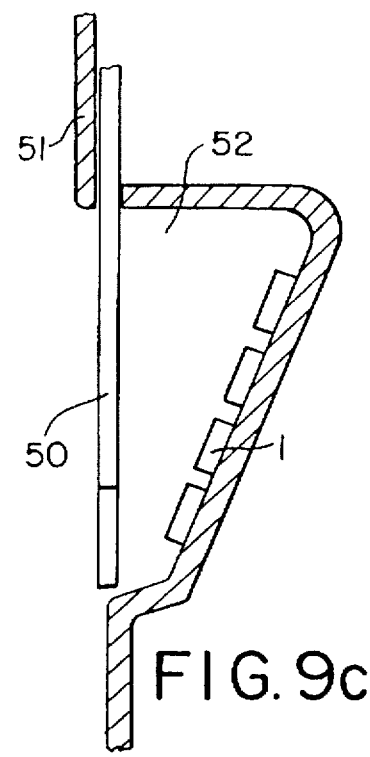
FIG. 9c is a side sectional view of the shield of FIG. 9b, shown in the down position where the keypad is covered.
Figure 9D:
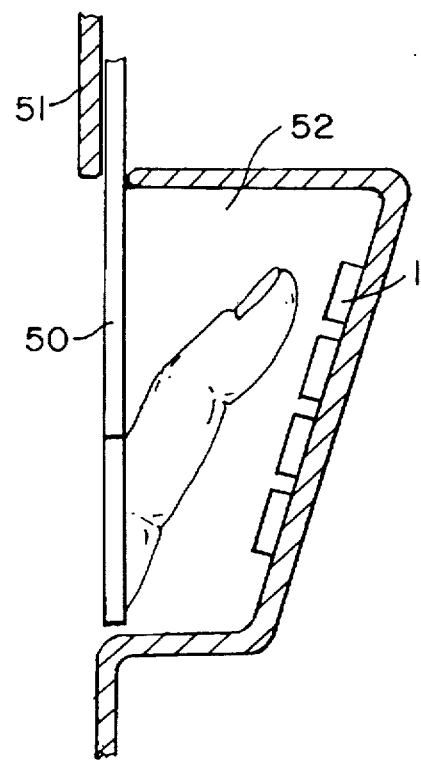
FIG. 9d is a side sectional view of the shield of FIG. 9b, shown in operation with the shield in the down position overtop of a users finger.

The notch allows the front member to be lowered yet the user can operate the keypad. FIGS. 9b and 9c show the front member slid into the down position. FIG. 9d shows the user's finger engaged in the notch such that user can access the keypad. The shield can be lowered part way down resting on top of the users's finger, hand or arm allowing the user's finger to reach under the shield to operate the keypad in a secure manner. Alternatively the shield can be raised all the way up if the user does not require security.

Figure 10:
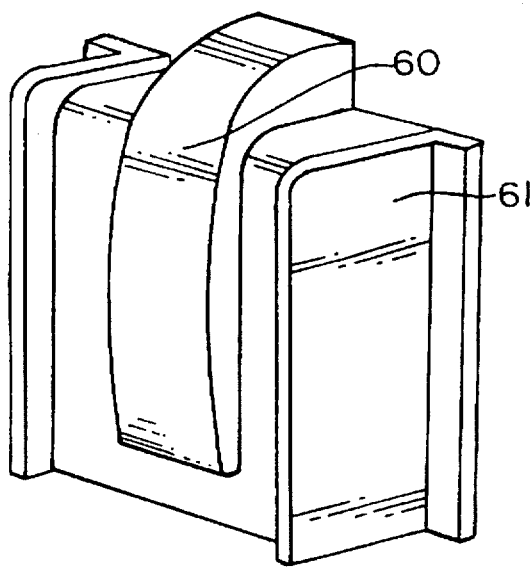
FIG. 10 is a perspective view of a shield which is operable to reciprocate in the front to back direction, and covers the keypad and the handset, the shield being shown retracted towards the rear and is viewed from the front right.

FIG. 10 shows a shield which is operable to reciprocate in the front to back direction, and covers the keypad and the handset. The shield has a front member 60, and side members 61 and is shown retracted towards the keypad. With the shield retracted, access to the handset and keypad is prevented because the shield prevents the receiver from being lifted off hook. This type of configuration is most useful in credit card activated configurations. The user must first slide their credit card through a magnetic card reader 62 (FIG. 11) prior to gaining access to the telephone handset and keypad.

Figure 11:
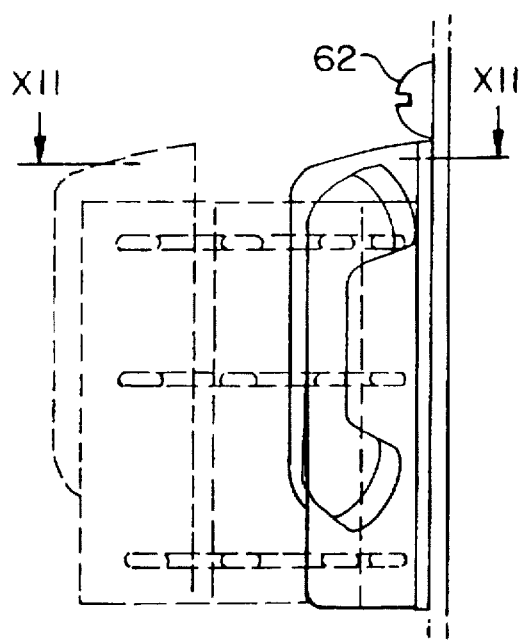
FIG. 11 is a side view the shield of FIG. 10 which is operable to reciprocate in the front to back direction, and covers the keypad and the handset, the shield having telescopic side members and being shown extended towards the front.
Figure 12:
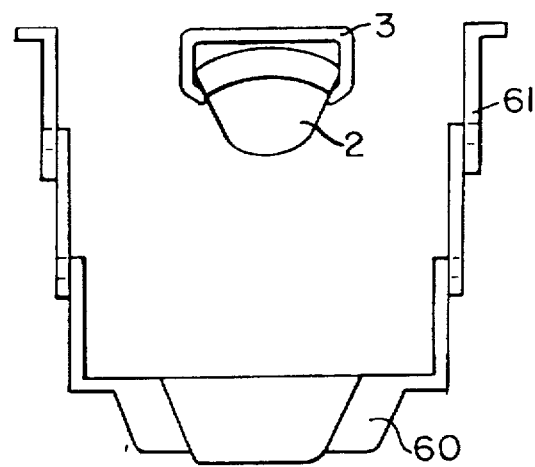
FIG. 12 is a to sectional view the shield of FIG. 10 along the section line XII, the shield is operable to reciprocate in the front to back direction, and covers the keypad and the handset, the shield has telescopic side members and is shown extended towards the front.

FIGS. 11 and 12 show the shield in the deployed position. With the shield in the deployed position, there is sufficient room for the telephone handset to be easily removed by reaching under the front member and lifting the handset off hook. The side members are parallel to each other and spaced apart such that there is sufficient clearance for the telephone handset and the user's hand between the side members. The front member 60 and keypad are spaced apart such that there is sufficient clearance for the user to access the keypad. The side members are shown as being telescopic however additional variations will now be apparent to persons skilled in the art.

Figure 13:
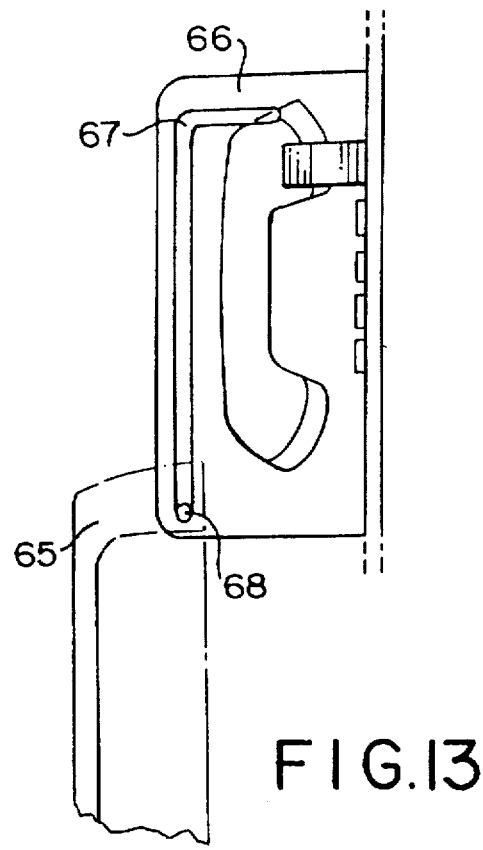
FIG. 13 is a side view of a shield which is operable to reciprocate in up and down direction via tracks in the side members, the front member is shown in the down position, and covers the keypad and the handset.

FIG. 13 shows an alternate embodiment wherein the front member 65 is both pivotable and slidable. As in the foregoing embodiments, the side members are attached on either side of the keypad with clearance for the telephone handset and the user's hand. The inside faces of the side members 66 have a slot 67 into which laterally protruding pins 68 of the front member engage. The slots can pass through the side members, but preferably are formed only on the inside faces of the side members so as to better obscure the keypad. With the front member in the up position the keypad is covered by the shield and can be pivoted for the user to reach the keypad. The front member can also me reciprocated down as shown if the user does not require security.

The front member is preferably translucent such that the user can view the keys through the front member. The side members are preferably opaque so that they obstruct the line of sight to the keypad when viewed from the periphery.

Alternatively the front member can be manufactured from a translucent material that is optically biased (e.g., to collimate the view of the keypad) or polarized so that only user who is standing directly in front of the keypad can see the keypad through the front member.

At the completion of a call, the receiver is placed on hook and the front member automatically retracted or manually pushed rearwardly thereby locking the handset in place.

Figure 14:
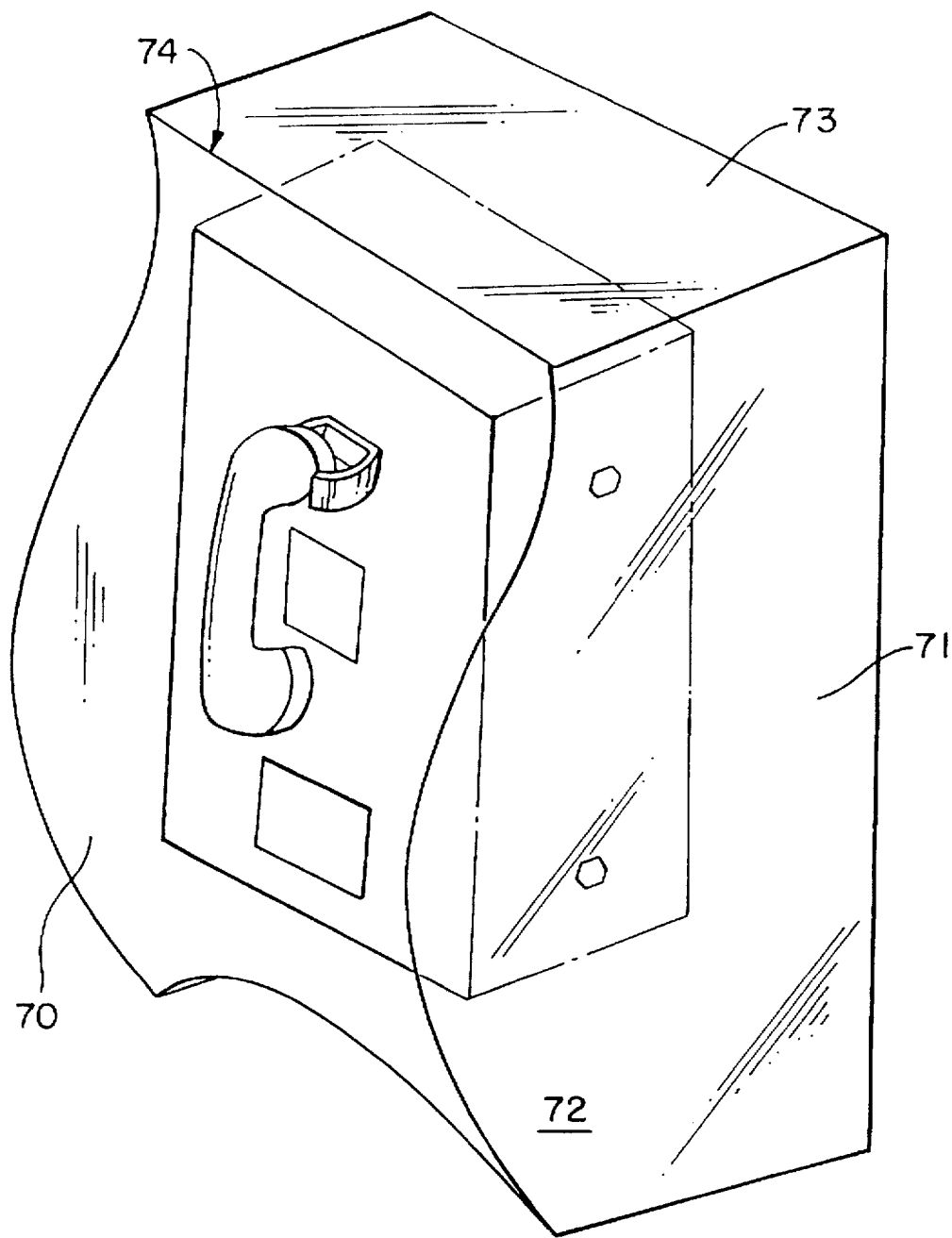
FIG. 14 is a perspective view of a shield which covers the keypad and the handset, the shield a front member which is hinged at the top and is operable to pivot in the front to back direction.

FIG. 14 shows an alternative embodiment wherein the shield encloses the entire telephone. The shield has a front member 70 and two side members 71. The shield also has a top member 73 which is coupled between the front member and the side members. The front member has a curved profile that matches the profile of the front edge of the side members 72. Sufficient space is provided between the front member and the handset so that the handset can be removed. In operation the user reaches under the front member, removes the handset, and operates the keypad.

The front member is preferably translucent such that the user can view the keys through the front member. The side and top members are preferably opaque so that they obstruct the line of sight to the keypad when viewed from the periphery.

Alternatively the front member can be manufactured from a translucent material that is optically biased (e.g., to collimate the view of the keypad) or polarized so that only a user who is standing directly in front of the keypad can see the keypad through the front member.

The front member can be translucent or otherwise optically biased, polarized or the like, to limit viewing to the user who is standing directly in front of the keypad. The user, who is within arm's reach of the keypad, can see the keypad through a translucent front member sufficiently for operation. The front member can alternatively be clear and provided with a collimating lens such that the image of the keypad is restricted to a relatively small angle.

In the drawings, a telephone handset is shown in combination with the invention. However, the invention can be mounted to other keypad devices such as ATM's and the like. The telephone handset is shown merely for convenience in this description and does not limit the invention for use only with telephone equipment.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

We claim:

1. A shield for concealing operation of a keypad, comprising a front member and at least one opaque side member, the opaque side member being mounted laterally adjacent to the keypad and the front member being movable between a stored position and a deployed position, the front member being positioned over the keypad when in the deployed position such that the entire keypad is manually operable and observable by a user located in front of the keypad, the front member defining a transparent, optically biased window which permits viewing of the entire keypad therethrough from a location directly in front of the window and which obscures viewing of the keypad therethrough from locations not directly in front of the keypad, and wherein the front member and the at least one side member at least partially obstruct a line of sight to the keypad when viewed obliquely.

2. The shield of claim 1, wherein the front member window is polarized or collimating.

3. The shield of claim 1, wherein the front member is movable in a front-to-back direction relative to the keypad.

4. The shield of claim 1, wherein the front member is pivotable relative to the keypad.

5. The shield of claim 4, wherein the front member is pivotable between vertical and horizontal orientations and reciprocates in a front to back direction relative to the keypad.

6. The shield of claim 1, comprising two side members disposed on opposite sides of the keypad, and wherein the front member is movably coupled to the side members.

7. The shield of claim 1, wherein the front member pivots on a horizontal axis between an up position and a down position.

8. The shield of claim 7, wherein the front member has a curved profile.

9. The shield of claim 8, comprising two side members disposed on opposite sides of the keypad, wherein the front member is fixed to the side members, and further comprising means for pivoting the front and side members between the stored position substantially clear of the keypad and the deployed position substantially covering the keypad.

10. In combination, a keypad and a shield for concealing operation of the keypad, the shield having a front member and at least one side member, the side member being mounted laterally adjacent to the keypad and the front member being movable between a stored position and a deployed position, the front member being positioned over the keypad when in the deployed position such that the entire keypad is operable and observable thought the front member by a user located in front of the keypad, and wherein the front member and the at least one side member at least partially obstruct a line of sight to the keypad when viewed obliquely.

11. The combination of claim 10, wherein the keypad is a keypad of a telephone having a handset, and wherein the front member is movable between the stored position clear of the handset and the deployed position over the keypad.

12. The combination of claim 11, comprising two side members disposed laterally adjacent to the keypad, the front member being movably attached to at least one of the side members.

13. The combination of claim 10, wherein the front member is substantially light transmissive and the side member is substantially opaque.

14. The combination of claim 10, wherein the keypad is a keypad of an automatic teller machine, and wherein the front member is movable between the stored position over the keypad and the deployed position wherein the user has access to the keypad.

15. The combination of claim 14, comprising two side members disposed laterally adjacent to the keypad, the front member being movable with respect to at least one of the two side members.

16. The combination of claim 14, comprising two side members disposed laterally adjacent to the keypad, the front member being movably attached to at least one of the side members.

17. A shield for concealing operation of a keypad, comprising a front member and a plurality of opaque side members, the opaque side members being mounted laterally adjacent to the keypad and the front member, the shield being movable between a stored position and a deployed position, the front member defining a transparent window being positioned over the keypad when the shield is in the deployed position such that the entire keypad is manually operable and observable through the transparent window in the font member by a user located in front of the keypad, and wherein the opaque side members at least partially obstruct lines of sight to the keypad when viewed obliquely.

18. The shield of claim 17, wherein the front member window is optically biased such that the window obscures the keypad when the keypad is viewed from a location not directly in front of the keypad.

19. The shield of claim 18, wherein the front member window is polarized or collimating.

* * * * *